United States Patent [19]

Ikematsu et al.

[11] Patent Number: 4,931,376

[45] Date of Patent: Jun. 5, 1990

[54] CRYSTALLINE TRANS-BUTADIENE POLYMERS

[75] Inventors: Takeshi Ikematsu, Musashino; Yasuo Hattori, Yokohama; Yoshihiro Inoki, Kawasaki; Mitsuhiro Tanaka, Yokohama, all of Japan

[73] Assignee: Asahi Kasei Kogyo Kabushiki Kaisha, Osaka, Japan

[21] Appl. No.: 387,428

[22] Filed: Jul. 28, 1989

Related U.S. Application Data

[63] Continuation of Ser. No. 748,555, Jun. 25, 1985, abandoned.

[30] Foreign Application Priority Data

Jul. 3, 1984 [JP] Japan ................. 59-136455
Jul. 6, 1984 [JP] Japan ................. 59-138950
Oct. 18, 1984 [JP] Japan ................. 59-217296

[51] Int. Cl.$^5$ ............................ C08F 36/06
[52] U.S. Cl. .................... 526/164; 526/335
[58] Field of Search ................. 526/164, 335

[56] References Cited

U.S. PATENT DOCUMENTS

| | | | |
|---|---|---|---|
| 3,502,747 | 3/1970 | Fischer | 526/335 |
| 3,550,158 | 12/1970 | Natta | 526/335 |
| 3,779,944 | 12/1973 | Cozewith | 526/335 |
| 3,846,385 | 11/1974 | Hargis | 526/335 |
| 3,865,749 | 2/1975 | Tornqvist | 526/335 |
| 3,887,536 | 6/1975 | Ichikawa | 526/335 |
| 3,962,130 | 6/1976 | Tornqvist | 526/335 |
| 3,992,561 | 11/1976 | Hargis | 526/335 |
| 4,080,492 | 3/1978 | Zarauz | 526/335 |
| 4,092,268 | 5/1978 | deZarauz | |
| 4,110,525 | 9/1978 | deZarauz | 526/177 |
| 4,112,210 | 9/1978 | deZarauz | 526/187 |
| 4,129,705 | 12/1978 | deZarauz | 526/175 |
| 4,148,985 | 5/1979 | deZarauz | 526/177 |
| 4,148,986 | 4/1979 | deZarauz | 526/177 |
| 4,152,505 | 5/1979 | deZarauz | 526/187 |
| 4,225,690 | 9/1980 | Halasa et al. | |
| 4,355,156 | 10/1982 | Bingham et al. | 528/413 |
| 4,413,098 | 11/1983 | Hattori et al. | 525/314 |
| 4,575,538 | 3/1986 | Hsieh et al. | 525/244 |
| 4,619,982 | 10/1986 | Jenkins | 526/164 |
| 4,699,962 | 10/1987 | Hsieh et al. | 526/142 |

FOREIGN PATENT DOCUMENTS 0091287 12/1983 European Pat. Off.
2932871 2/1980 Fed. Rep. of Germany.

Primary Examiner—Paul R. Michl
Assistant Examiner—Mark R. Buscher
Attorney, Agent, or Firm—Birch, Stewart, Kolasch & Birch

[57] ABSTRACT

A butadiene polymer or a copolymer of butadiene with another conjugated diene having the following structural parameters and physical properties:
(a) a content of butadiene moiety in the polymer or copolymer of at least 80% by weight,
(b) a content of trans-1,4 linkage in the butadiene moiety of 80% to 95%,
(c) a molecular weight distribution (Mw/Mn) of 1.2 to 4.0 as measured by gel permeation chromatography,
(d) a melting temperature of the crystal of 40° C. to 130° C. as measured by DSC, and
(e) a content of insolubles in boiling cyclohexane of 1% or less;
a process for producing butadiene polymers, which comprises carrying out solution polymerization of butadiene monomer or budadiene monomer with another conjugated monomer in an inert solvent in the presence of a catalyst, which is a complex catalyst of (a) an organic acid salt of lanthanum or cerium and (b) an organic magnesium compound; and
a polymeric resin material, comprising at least 30% by weight of a trans-butadiene polymer or copolymer as described above as a polymeric component.

The above-described polymeric resin material is used as a golf ball cover material, a splint or gyps material, a head mold material for a wig, etc.

32 Claims, No Drawings

CRYSTALLINE TRANS-BUTADIENE POLYMERS

This application is a continuation, of application Ser. No. 06/748,555 filed on Jun. 25, 1985, now abandoned.

TECHNICAL FIELD

The present invention is intended to provide crystalline trans-butadiene polymers which are excellent in moldability and processability, and also excellent in physical properties such as rigidity, strength, impact resistance, etc., a process for production thereof and a polymeric composition containing such polymers. These polymers and composition can be utilized for various uses due to their characteristics depending on their structures and compositions, such as medical materials (e.g. gyps, splint, etc.), head mold materials for wigs, materials for teeth mold, materials for design mold, plastic clay, toy materials, asphalt binder materials, modifiers for speciality rubbers such as chloroprene, wire coating materials, golf ball cover materials, and so forth.

BACKGROUND ART

It has been known in the prior art that butadiene polymers having a high content of trans-linkage can be produced by the techniques which may be classified into the three categories as described below.

That is, they can be produced according to the production techniques employing (1) the so-called Ziegler catalyst system comprising a transition metal compound as the main component, (2) the anionic polymerization catalyst system comprising an alkaline earth metal compound as the main component, and (3) the catalyst system comprising a rare earth metal compound as the main component.

The first technique employing a transition metal such as nickel, cobalt, titanium, vanadium, etc. as the main component is known to effect highly stereoregular polymerization. For example, as the method for polymerization of butadiene by using titanium metal, there is the method in which a tetravalent titanium metal compound and a carrier of a magnesium halide are employed (Japanese Laid-open Patent Publication No. 67387/1976). In the case when employing a vanadium compound as the main component, a polymer having a very high content of trans-linkage can be obtained. For example, there have been known the method in which isoprene is polymerized by using a complexed catalyst comprising tetravalent vanadium halide and an organic aluminum (Japanese Laid-open Patent Publication No. 36585/1975), and further the method in which isoprene is polymerized by using a complexed catalyst comprising a trivalent or tetravalent vanadium compound, an organic aluminum and a tetravalent titanium compound (Japanese Laid-open Patent Publications Nos. 29386/1974 and 122586/1975). However, these catalysts have the drawbacks that they are generally insoluble in hydrocarbon solvents and also provide polymers which are likely to become highly branched with the progress of polymerization, and the polymers obtained have a markedly broad molecular weight distribution. Such polymers are inferior in processability and moldability, and also disadvantageously inferior in physical properties such as resilience, strength and impact resistance of the molded articles obtained.

On the other hand, as the method belonging to the above category (2), there is an example in which an organic metal compound of IIA metal is used as the polymerization catalyst. However, generally speaking, organic metal compounds of IIA metals other than beryllium and magnesium can be synthesized with difficulty, and their activities for polymerization of conjugated dienes are markedly low. In the case of organic metal compounds of beryllium and magnesium, while they can be synthesized with relative ease, they have no activity for polymerization of conjugated dienes except under some special reaction conditions, and there is no example of practical application. Whereas, the method in which a complexed catalyst comprising a combination of an organic compound of IIA metal with another organic metal compound is used, may be exemplified by polymerization of butadiene by using barium-di-tert-butoxide and an organic lithium (U.S. Pat. No. 3,992,561) or barium-di-tert-butoxide and an organic magnesium (U.S. Pat. No. 3,846,385). Further, it has also been known to carry out the polymerization of conjugated dienes by using an organic compound of barium or strontium, an organic lithium and an organic metal compound of IIB or IIIA metal (U.S. Pat. No. 4,092,268). In the systems employing the complexed catalysts comprising these IIA compounds, conjugated diene polymers having a somewhat high content of trans-linkage can be obtained, having the molecular weight distribution being also relatively narrower. However, when it is desired to obtain a polymer having a still higher content, for example as high as 80%, of trans-linkage in the diene moiety, it is generally required to employ a lower polymerization temperature. In this case, the polymerization activity of these catalyst systems will become markedly lower and unsatisfactory for industrial application.

Under such special conditions, polymers with high content of trans-linkage, and narrow molecular weight distribution can also be obtained. However, these polymers are markedly lower in 1,2-linkage content as compared with the polymers of the present invention and, probably because of the difference in crystalline structure between the polymers due to such a difference, they were inferior in physical properties, particularly in impact resistance, of the polymers.

Further, as the catalyst belonging to the above category (3), a complexed catalyst employing a rare earth metal compound as the main catalyst and an organic magnesium compound as the co-catalyst is also known. For example, in European Patent No. 0,091,287, there is proposed the method in which a Versatic Acid salt such as of Di, Nd, Pr, etc. is used. However, such a complexed catalyst involves the drawbacks such that it is very low in its polymerization activity, also the polymer obtained has a low molecular weight, and further that the molecular weight distribution is broad, thus providing no polymer having physical properties for practical use.

As described above, although various production techniques have been known in the art, there has been known no method for obtaining a crystalline trans-butadiene polymer having a high content of trans-linkage, a narrow molecular weight distribution and containing substantially no gel at levels utilizable for industrial application. Also, the trans-butadiene polymers obtained in such prior art techniques involved problems in that they were inferior in moldability and workability, and also inferior in balance between physical properties such as rigidity, strength, resilience, impact resistance, etc.

Solution polymerization of butadiene in a hydrocarbon solvent has been carried out by using a complexed catalyst comprising (a) an organic acid salt of lanthanum or cerium and (b) an organic magnesium compound, and consequently found that a crystalline trans-butadiene polymer having a high trans-linkage content, a narrow molecular weight distribution and containing substantially no gel, can be obtained, and further that the polymer obtained can be easily molded and worked at a relatively lower temperature, is excellent in miscibility with inorganic fillers or other various resins, and also excellent in physical properties such as regidity, strength, resilience, impact resistance, etc., in either a vulcanized or unvulcanized state, and thus have accomplished the present invention.

SUMMARY OF THE INVENTION

An object of the present invention is to provide crystalline trans-butadiene polymers having specific structures excellent in moldability and workability at relatively lower temperatures and also excellent in physical properties.

Another object of the present invention is to provide a process for producing the polymers as described above.

Still another object of the present invention is to provide a composition and a vulcanized product thereof comprising the above-described polymer, and further improved in its characteristics.

Specifically, in the first aspect of the present invention, there is provided a butadiene polymer or a copolymer of butadiene with another conjugated diene having the following structural parameters and physical properties:

(a) a content of butadiene moiety in the polymer or copolymer of at least 80% by weight;

(b) a content of trans-1,4-linkage in the butadiene moiety of 80% to 95%;

(c) a molecular weight distribution (Mw/Mn) of 1.2 to 4.0 as measured by gel permeation chromatography;

(d) a melting temperature of the crystal of 40° C. to 130° C. as measured by DSC; and (e) a content of insolubles in boiling cyclohexane of 1% or less.

The polymer of the present invention is required to satisfy the above requirement (a). If the weight percentage of butadiene moiety in the polymer is lower than 80%, the high rigidity, strength and resilience which are specific features of a crystalline trans-polybutadiene will undesirably be lowered.

The polymer of the present invention is required to satisfy the above requirement (b). If the trans-linkage content in the butadiene moiety as measured by an IR spectrophotometer and calculated by the Morero method is lower than 80%, no polymeric resin material with sufficient rigidity, strength, resilience and impact strength can be obtained. On the other hand, if the trans-linkage is too high, the softening temperature of the polymeric resin material will become too high, whereby moldability and workability at relatively lower temperatures will undesirably be lowered.

The polymer of the present invention is required to satisfy the above requirement (c). If the molecular weight distribution is broader than this range, moldability and rigidity will undesirably be lowered. On the other hand, a polymer with too narrow a molecular weight distribution can be produced with difficulty and no advantage in physical properties can be recognized.

The polymer of the present invention is also required to satisfy the above requirement (d). If the melting temperature is lower than 40° C., the specific feature of a crystalline trans-butadiene polymer that it is hardened by crystallization at room temperature cannot fully be exhibited. On the other hand, with too high a melting temperature, moldability and workability will undesirably be lowered.

Further, the polymer of the present invention is required to satisfy the above requirement (e). Preferably, no gel should be contained in the transbutadiene polymers of the present invention. Particularly, a gel content in excess of 1% will markedly worsen moldability and workability of the polymer, also resulting unfavorably in lowering of resilience and impact strength.

Also, with respect to the 1,2-linkage content in the butadiene moiety as measured by an IR spectrophotometer and calculated according to the Morero method, it is preferable to satisfy the following relationship:

$$V \gtreqqless 21.5 - 0.2T$$

wherein V is the vinyl-linkage content (%),
and T is the trans-linkage content.

A polymer having a markedly low value of this parameter is inferior in impact strength, probably because of the difference in crystalline structure.

The polymer of the present invention should preferably have a weight average molecular weight $\overline{Mw}$ of 30,000 to 300,000 as measured by gel permeation chromagography. If the weight average molecular weight ($\overline{Mw}$) is less than this range, no polymeric resin material with sufficient strength can be obtained. On the other hand, if it is higher than this range, operability during molding or working will markedly be lowered.

In the second aspect of the present invention, there is provided a process for producing crystalline trans-butadiene polymers, which comprises using a complexed catalyst comprising (a) an organic acid salt of lanthanum or cerium and (b) an organic magnesium compound as the essential components.

Lanthanum and cerium which are the main components in the complexed catalyst of the present invention are metals occurring abundantly among lanthanide transition metals (rare earth metals) and commercially readily available at relatively low cost. In the prior art, as for their performance as the conjugated diene polymerization catalyst, they have been known to be capable of producing polymers having high cis content, but their activities were very low [for instance, J. Polym. Sci., Polym. Chem. Ed., 18, 3345 (1980)], and nothing has been known about obtaining a butadiene polymer having high trans-linkage content.

Whereas, we have studied extensively about the complexed catalysts containing lanthanum or cerium, and surprisingly found that a conjugated diene can be polymerized by using the complexed catalyst of the present invention to provide a conjugated diene polymer having high trans content at a very high activity, and yet the polymer obtained has a high molecular weight and a narrow molecular weight distribution, containing substantially no gel, the polymer thus obtained exhibiting excellent workability and physical properties.

The organic acid salt of lanthanum or cerium which is the component (a) in the complexed catalyst of the present invention can readily be obtained by, for example, making an alkali metal salt of an organic acid as shown below to react with a chloride of lanthanum or cerium in water or an organic solvent such as alcohols, ketones, etc.

The organic acid salt of lanthanum or cerium may contain inorganic salts of lanthanum or cerium or organic acids as the impurities in small amounts.

The organic acid compounds to be employed are represented by the formulae (I) to (VIII) as shown below:

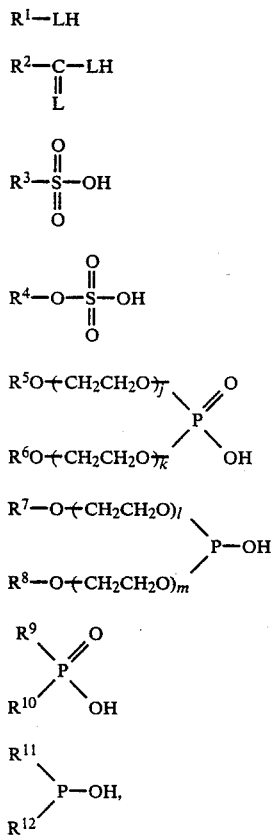

wherein each of $R^1$, $R^2$ and $R^5$-$R^8$ represents an aliphatic hydrocarbon group or an aromatic hydrocarbon group, $R^3$ an aromatic hydrocarbon group, $R^4$ an aliphatic hydrocarbon group, each of $R^9$-$R^{12}$ an aliphatic hydrocarbon group, an aromatic hydrocarbon group, an alkoxy group or a phenoxy group, L an oxygen atom or a sulfur atom, and j, k, l and m are integers of 1 to 6.

The above formula (I) represents alcohols, thioalcohols, phenols or thiophenols. Examples of these may include methyl alcohol, ethyl alcohol, n-propyl alcohol, iso-propyl alcohol, tert-butyl alcohol, tert-amyl alcohol, n-hexyl alcohol, cyclohexyl alcohol, aryl alcohol, 2-butenyl alcohol, 3-hexenyl alcohol, 2,5-decadienyl alcohol, benzyl alcohol, phenol, catechol, 1-naphthol, 2-naphthol, 2,6-di-tert-butylphenol, 2,6-di-tert-butyl-4-methylphenol, 2,4,6-tri-tert-butylphenol, 4-phenylphenol, ethanethiol, 1-butanethiol, 2-pentanethiol, 2-isobutanethiol, thiophenol, 2-naphthalenthiol, cyclohexane-thiol, 3-methylcyclohexanethiol, 2-naphthalenethiol, benzene-methanethiol, 2-naphthalenemethanethiol and the like.

The formula (II) represents carboxylic acids or sulfur analogues thereof. Examples of these may include iso-valeric acid, caprylic acid, octanoic acid, lauric acid, myristic acid, palmitic acid, stearic acid, oleic acid, linoleic acid, cyclo-pentanecarboxylic acid, napthenic acid, ethylhexanoic acid, pivalic acid, Versatic Acid (synthetic acid constituted of a mixture of isomers of $C_{10}$ mono-carboxylic acids sold by Shell Chemical Co.), phenylacetic acid, benzoic acid, 2-naphthoic acid, hexanethionic acid, 2,2-dimethylbutanethionic acid, tetradecanethionic acid, thiobenzoic acid and the like.

The formula (III) represents alkyl aryl sulfonic acids, as exemplified by dodecylbenzenesulfonic acid, tetradecylbenzenesulfonic acid, hexadecylbenzenesulfonic acid, octadecylbenzenesulfonic acid, dibutylnaphthalenesulfonic acid, n-hexylylnaphthalenesulfonic acid, dibutylphenylsulfonic acid and the like.

The formula (IV) represents mono-alcohol esters of sulfuric acid, such as sulfuric acid mono-ester of lauryl alcohol, sulfuric acid mono-ester of oleyl alcohol, sulfuric acid mono-ester of stearyl alcohol and the like.

The formula (V) represents phosphate diesters of ethylene oxide adduct of alcohol or phenol. Examples of these may include phosphate diester of ethylene oxide adduct of dodecyl alcohol, phosphate diester of ethylene oxide adduct of octyl alcohol, phosphate diester of ethylene oxide adduct of stearyl alcohol, phosphate diester of ethylene oxide adduct of oleyl alcohol, phosphate diester of ethylene oxide adduct of nonylphenol, phosphate diester of ethylene oxide adduct of dodecyl-phenol and the like.

The formula (VI) represents phosphite diesters of ethylene oxide adduct of alcohol or phenol. Examples of these may include phosphite diester of ethylene oxide adduct of dodecyl alcohol, phosphite diester of ethylene oxide adduct of stearyl alcohol, phosphite diester of ethylene oxide adduct of oleyl alcohol, phosphite diester of ethylene oxide adduct of nonylphenol, phosphite diester of ethylene oxide adduct of dodecylphenol and the like.

The formula (VII) represents pentavalent organic phosphoric acid compounds, including, for example, dibutyl phosphate, dipentyl phosphate, dihexyl phosphate, diheptyl phosphate, dioctyl phosphate, bis(1-methylheptyl) phosphate, bis(2-ethyl-hexyl) phosphate, dilauryl phosphate, dioleyl phosphate, diphenyl phosphate, bis(p-nonylphenyl) phosphate, butyl(2-ethylhexyl) phosphate, (1-methylheptyl) (2-ethylhexyl) phosphate, (2-ethylhexyl)(p-nonylphenyl) phosphate, monobutyl(2-ethylhexyl) phosphonate, mono-2-ethylhexyl(2-ethylhexyl) phosphonate, mono-2-ethylhexyl phenyl phosphonate, mono-p-nonylphenyl(2-ethylhexyl) phosphonate, dibutylphosphinic acid, bis(2-ethylhexyl) phosphinic acid, bis(1-methylheptyl)phosphinic acid, dilaurylphosphinic acid, dioleylphosphinic acid, diphenylphosphinic acid, bis(p-nonylphenyl)phosninic acid, butyl(2-ethyhexyl)phosphinic acid, (2-ethylhexyl) (1-methyl-heptyl)phosphinic acid, (2-ethylhexyl) (p-nonylphenyl)phosphinic acid and the like.

The formula (VIII) represents trivalent phosphorous acid compounds, as exemplified by bis(2-ethylhexyl) phosphite, bis(1-methylheptyl) phosphite, bis(2-ethylhexyl)phosphinous acid and the like.

Another catalyst component (b) organic magnesium compound which forms the present invention is represented by the following formula (IX):

$$Mg\ R^{13}R^{14} \qquad (IX),$$

wherein each of $R^{13}$ and $R^{14}$, which may be the same or different, represents an aliphatic hydrocarbon group or an aromatic hydrocarbon group.

The organic magnesium may also contain organic aluminum, organic zinc, etc. in a small amount for improvement of its solubility in a hydrocarbon solvent.

Preferable examples of such compounds are diethyl magnesium, di-n-propyl magnesium, di-isopropyl magnesium, di-n-butyl magnesium, n-butyl-sec-butyl magnesium, di-sec-butyl magnesium, di-tert-butyl magnesium, di-n-hexyl magnesium, di-n-propyl magnesium, diphenyl magnesium, MAGALA-6E, 7.5 E (Texans Alkyl Co.). More preferably, there may be employed di-isopropyl magnesium, di-n-butyl magnesium, di-sec-butyl magnesium, MAGALA-6E, -7.5E, etc.

The complexed catalyst of the present invention has a very high activity, and the amount of the catalyst used may preferably be 0.01 to 1 mmole, more preferably 0.05 to 0.6 mmole, for the component (a), per 100 g of the conjugated diene monomer to be polymerized. The amount of the component (b), similarly represented in terms of the concentration per 100 g of the conjugated diene monomer, may preferably be 0.02 to 10 mmole, more preferably 0.1 to 6 mmole. Generally speaking, if the amount of the organic magnesium is too small for a given amount of lanthanum metal, not only lowering in polymerization activity will be brought about, but also the trans-linkage content in the conjugated diene polymer obtained will be lowered, and its molecular weight distribution will become broad. On the contrary, if the organic magnesium employed is too much, while the molecular weight distribution of the conjugated diene polymer obtained may become narrower on one hand, both polymerization activity and trans-linkage content will be lowered on the other hand. Also, an employment of a larger amount of the catalyst than is necessary not only increases the amount of the catalyst residue remaining in the conjugated diene polymer, but also it is not preferable in economical aspect. Thus, a preferable amount of the complexed catalyst employed in the present invention may be, as represented by the ratio of the constituents (a) and (b) of the catalyst, namely (a)/(b) of 1/0.1 to 1/50, more preferably 1/0.5 to 1/10.

The complexed catalyst of the present invention can further be enhanced in its polymerization activity by further making at least one component selected from (c) organic compounds of lithium, (d) organic aluminum compounds and (e) electron donating compounds to be co-present preferably at a molar ratio relative to the organic magnesium compound of 1/10 or more. The available organic compounds of lithium may be represented by the following formulae (X)-(XV):

$$R^{15}(Li)_w \qquad (X)$$

$$R^{16}(OLi)_x \qquad (XI)$$

$$R^{17}(OCH_2CH_2)_yOLi \qquad (XII)$$

(XIII)

(XIV)

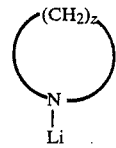
(XV)

wherein each of $R^{15}$, $R^{16}$, $R^{17}$, $R^{18}$, $R^{19}$, $R^{20}$ and $R^{21}$ represents an aliphatic hydrocarbon group or an aromatic hydrocarbon group, and each of w, x, y and z represents an integer of 1 to 6.

Examples of the formula (X) may include methyllithium, ethyllithium, n-propyllithium, isopropyllithium, n-butyllithium, sec-butyllithium, tert-butyllithium, isoamyllithium, sec-amyl-lithium, n-hexyllithium, n-octyllithium, allyllithium, benzyl-lithium, phenyllithium, 1,1-diphenyllithium, tetramethylenedilithium, pentamethylenedilithium, 1,2-dilithio-1,1,2,2-tetra-phenylethane, 1,3-bis(1-lithio-1,3-dimethylpentyl)benzene, and the like. Preferably, organic lithium compounds such as n-butyl-lithium, sec-butyllithium, tert-butyllithium, 1,3-bis(1-lithio-1,3-dimethylpentyl)benzene, etc. may be employed.

Examples of the formula (XI) may include lithium salts of alcohols and phenols such as ethyl alcohol, n-propyl alcohol, iso-propyl alcohol, n-butyl alcohol, iso-butyl alcohol, 2-butyl alcohol, tert-butyl alcohol, n-amyl alcohol, n-hexyl alcohol, n-heptyl alcohol, n-octyl alcohol, cyclohexyl alcohol, allyl alcohol, cyclopentyl alcohol, benzyl alcohol, phenol, 1-naphthol, 2,6-di-tert-butylphenol, 2,4,6tri-tert-butylphenol, nonylphenol, 4-phenylphenol, etc.

Examples of the formula (XII) may include lithium salts of ethylene glycol monomethyl ether, ethylene glycol monoethyl ether, ethylene glycol monobutyl ether, ethylene glycol monopropyl ether, diethylene glycol monomethyl ether, diethylene glycol monoethyl ether, diethylene glycol monobutyl ether, triethylene glycol monobutyl ether, diethylene glycol monophenyl ether and the like.

The formula (XIII) may be exemplified by lithium salts of dimethylaminoethanol, diethylaminoethanol, di-n-propylamino-ethanol and the like.

The formula (XIV) may be exemplified by lithium salts of secondary amines such as dimethylamine, diethylamine, di-n-propylamine, di-iso-propylamine, di-n-butylamine, di-n-hexylamine and the like.

The formula (XV) may be exemplified by lithium salts of cyclic imines such as ethyleneimine, triethyleneimine, pyrrolidine, piperidine, hexamethyleneimine, etc.

Particularly preferable organic compounds of lithium are n-butyllithium, sec-butyllithium and iso-amyllithium.

By controlling the ratio of the amount of the organic lithium compound co-present to that of the organic magnesium compound in the complexed catalyst of the present invention, it is possible to vary the trans-linkage content in the conjugated diene polymer obtained. Generally, polymerization activity is increased, while the trans-linkage content in the conjugated diene polymer obtained is decreased, as the amount of the organic compound of lithium employed is increased. However, when an appropriate amount of such a compound is employed, it is possible to obtain a polymer with a high trans-linkage content at higher activity. Accordingly, although the amount of the organic compound of lithium to be used may differ depending on the trans-linkage content in the polymer, when generally obtaining a polymer having a translinkage content of 80% or more, the Li/Mg molar ratio as represented by the ratio of lithium atoms in the organic compound of lithium to magnesium atoms in the organic magnesium compound should desirably be 1.5 or less. Particularly, when a resinous type polymer having a trans-linkage content of 85% or higher is desired to be obtained, the Li/Mg molar ratio should desirably be 0.7 or less.

The (d) organic aluminum compound, which can be made to be co-present as the second component in the catalyst for enhancing polymerization activity of the complexed catalyst, can be represented by the following formula (XVI):

$$AlR^{22}R^{23}R^{24} \qquad (XVI)$$

(wherein each of $R^{22}$ and $R^{23}$ represents a hydrogen or an aliphatic hydrocarbon group, and $R^{24}$ represents an aliphatic hydrocarbon group).

Examples of such compounds may include trimethylaluminum, triethylaluminum, triisopropylaluminum, triisobutylaluminum, trihexylaluminum, tricyclohexylaluminum, diethylaluminum hydride, diisobutylaluminum hydride, ethylaluminum dihydride, isobutylaluminum dihydride and the like. Particularly preferred are triethylaluminum, triisobutylaluminum, diethylaluminum hydride and diisobutylaluminum hydride. When employing an organic aluminum compound, too much an amount thereof used will contrariwise lower both of polymerization activity and trans-linkage content. Therefore, the amount of the organic aluminum used should be controlled at an adequate level, in which case both of polymerization activity and trans-linkage content can be enhanced. Generally speaking, the organic aluminum compound employed, as represented in terms of Al/Mg molar ratio, should preferably be 10 or less, more preferably 1 or less.

Further, as the third component which can enhance the polymerization activity of the complexed catalyst, it is possible to make (e) electron donating compound be co-present in the catalyst. Examples of such compounds may include compounds known as the so called Lewis bases, generally ethers, thioethers, and amines. Illustrative of such compounds are ethers such as dimethyl ether, diethyl ether, diphenyl ether, tetrahydrofuran, anisole, diglyme, etc.; amines such as dimethylamine, diethylamine, trimethylamine, triethylamine, di-n-butylamine, aniline, diphenylamine, N-ethylaniline, N,N,N',N'-tetramethylethylene-diamine, dipiperadinoethane, etc.; and further thioethers such as thiophene, tetrahydrothiophene, 2,5-dihydrothiophene, etc. Preferably, diethyl ether, tetrahydrofuran, triethylamine and N,N,N', N'-tetramethylethylenediamine may be employed. The amount of the electron donating compound employed, which may differ depending on the strength as the Lewis base possessed by the compound, may generally be smaller for a compound with stronger basicity as compared with a compound with weaker basicity. The electron donating compound as described above, when employed in a large amount, will contrariwise not only lower polymerization activity of said composite catalyst, but also lower trans-linkage content in the polymer. A preferable amount to be employed, as represented by the moles per mole of the organic magnesium compound, may be 50 or less, more preferably 5 or less.

(c) The organic lithium compound, (d) the organic aluminum compound and (e) the electron donating compound may be individually employed or two or more components of these compounds may be used at the same time. When any one of these compounds may be used, butadiene polymers having high trans-linkage content can be obtained at high conversion by using an appropriate amount of such a compound.

The complexed catalyst in the present invention can also be subjected to a preliminary reaction of the catalyst prior to polymerization in the presence or absence of a conjugated diene monomer, whereby its polymerization activity can further be increased and the molecular weight of the conjugated diene polymer obtained can be made narrower. In this case, (c) the organic compound of lithium, (d) the organic aluminum compound and (e) the electron donating compound may also be co-present in the preliminary reaction system.

The preliminary reaction should preferably be carried out at a reaction temperature of 0° to 100° C. At a temperature lower than this range, no sufficient preliminary reaction can be effected, while at a temperature over 100° C., the molecular weight distribution will undesirably be extended. A preferable temperature is in the range of from 20° C. to 80° C. The reaction time should preferably be from 0.01 to 24 hours. A shorter reaction time will give only insufficient preliminary reaction, while a longer reaction time is superfluous. Particularly preferable conditions would be from 0.05 to 5 hours. It is also possible to make a conjugated diene exist in carrying out the preliminary reaction and, in this case, the conjugated diene polymer obtained will have a further narrower molecular weight distribution. A preferable amount of the conjugated diene monomer to be employed in the preliminary reaction may be 1 to 1000, as represented in terms of molar ratio relative to lanthanum or cerium metal atoms. At a level either lower or higher than this range, the effect by the presence of a conjugated diene monomer can little be exhibited. Besides, when a conjugated diene monomer exists in an amount higher than the above molar ratio, temperature control in the preliminary reaction can be done with difficulty, because abrupt polymerization of the conjugated diene monomer may be brought about. A particularly preferred molar ratio is in the range of from 5 to 200.

The monomer to be used in the present invention is butadiene monomer or a mixture of butadiene monomer with other conjugated diene monomers. Examples of monomers other than butadiene preferably used may include isoprene, 2,3-dimethyl-1,3-butadiene, 1,3-pentadiene, 2,4-hexadiene, 2-phenyl-1, 3-butadiene, etc.

The most preferred practical mode of polymerization in the present invention is butadiene homopolyzation or butadiene-isoprene copolymerization.

Polymerization in the present invention may be practiced in absence of a solvent, but generally in the presence of a solvent. In the latter case, the solvent to be used may preferably an aliphatic or alicyclic hydrocarbon such as n-pentane, n-hexane, n-heptane, cyclohexane and the like or an aromatic hydrocarbon such as benzene, toluene and the like. These may be mixtures of two or more compounds or may also contain small amounts of impurities. The polmerization temperature may be 0° C. to 150° C., preferably 40° C. to 120° C. The polymerization reaction system may be either batchwise or continuous.

The polymerization reaction, on reaching a desired polymerization degree, can be stopped by addition of a known polymerization terminator into the reaction system, followed by the conventional steps of desolventization and drying in production of conjugated diene polymers.

Further, it is also easily possible as a matter of course to lower the trans-content, lower the molecular weight or broaden the molecular weight distribution of the butadiene polymers obtained, if necessary. For example, in the case of a butadiene polymer, the trans-content can be controlled freely within the range of from 98% to 60% by controlling the catalyst composition or the polymerization temperature, whereby either a highly crystalline resinous polymer or a non-crystalline rubbery polymer can be produced. The molecular weight of the polymer can be controlled within the range of from some thousands to some hundreds of thousands by controlling the composition or the concentration of the catalyst employed. Further, the molecular weight distribution of the polymer can be controlled within the range of from 1.1 to 3.0 of Mw/Mn by controlling the composition of the catalyst employed.

If necessary, it is also possible to impart a branched structure to the polymer chain or broaden the molecular weight distribution according to the known coupling reaction technique, for example, the method in which a coupling agent reactive with terminals of a living polymer, such as an ester compound, a halogenated hydrocarbon compound, a halogenated silicon compound and a halogenated tin compound or a polyfunctional monomer such as divinylbenzene is added to the polymerization system in the course of polymerization or after completion of polymerization.

The third aspect of the present invention resides in providing the resin compositions containing the crystalline trans-butadiene polymers as described above. These resin compositions make the best use of the specific features of the crystalline trans-butadiene polymers, namely excellent rigidity, resilience and impact resistance as well as easy moldability and workability at relatively lower temperatures, and are useful for various polymeric resin materials under either unvulcanized or vulcanized state. More specifically, examples of uses may include various ones depending on the structure and the composition of the material, such as medical materials (e.g. gyps, splint, etc.), head mold materials for wig, materials for teeth mold, materials for design mold, plastic clay, toy materials, asphalt binder materials, modifiers for speciality rubbers such as chloroprene, wire coating materials, golf ball cover materials, etc.

The polymeric resin material of the present invention should ordinarily be preferred to contain a polymer component which is constituted only of a transbutadiene polymer, but sometimes preferred depending on uses to contain a mixture with other polymer resins for improvement of softening temperature, moldability, rigidity, strength, resilience, impact resistance, etc. However, also in this case, no effect of the present invention can fully be exhibited, unless the trans-polybutadiene polymers are contained in an amount of at least 30% by weight as the polymer resin component.

Other polymeric resin components to be mixed which are particularly preferred may include transisoprene polymers, trans-polyoctenamers and caprolactone polymers.

The trans-isoprene polymer to be employed in the present invention may be exemplified by Kuraray TP-301 produced by Kuraray Isoprene Chemical K.K. The trans-polyoctenamer to be employed in the present invention may be exemplified by Vestenamer 8012 and Vestenamer A9 produced by Hüls Co. Further, as the caprolactone polymer, there may be employed Placcel H-7, Placcel H-4 and Placcel H-1 produced by Dicel Kagaku Kogyo K.K.

In the composition containing crystalline trans-butadiene polymers of the present invention, inorganic fillers or plastizers may be formulated in addition to the polymeric resin components as described above, if desired, for the purpose of controlling hardness or plasticity of the composition. Also, stabilizers, pigments, etc. which are general additives to be added in polymeric resin materials may be added suitably in the case of the present invention in the same way as in resin materials of the prior art.

The amount of inorganic fillers used may be 5 to 100 parts by weight per 100 parts by weight of the polymeric resin component. Examples of fillers may include titanium oxide, silica, calcium carbonate, clay, talc, mica, bentonite, etc. Use of inorganic fillers at a level exceeding 100 parts by weight will undesirably lower the impact strength of the polymeric resin material obtained.

The amount of plasticizers used may generally be within the range of from 1 to 20 parts by weight per 100 parts by weight of the polymeric resin component. Examples of plasticizers may include dibutyl phthalate, di-(2-ethylhexyl) phthalate, di-(2-ethylhexyl) adipate, diethylene glycol benzoate, butyl stearate, butylepoxy stearate, tri-(2-ethylhexyl) phosphate, etc.

The polymeric resin material of the present invention can easily be mixed by means of an extruder, a kneader, rolls, etc. The operation temperature in these apparatus may be freely selected within the range of from 60° to 200° C., preferably from 80° to 180° C. It is also possible to mix the components in a solution dissolved in a suitable solvent.

The polymeric resin material containing the crystalline trans-butadiene polymers can be used generally without vulcanization. However, depending on uses such as golf ball cover materials, etc., it is sometimes preferable to use the material with further improvement of strength and impact resistance by vulcanization. As the vulcanization, various vulcanization methods known as the vulcanization methods for conjugated diene polymers can be adopted. However, particularly depending on the purpose such as making best use of high rigidity and elasticity of crystalline trans-butadiene polymers, it is preferred to vulcanize the trans-butadiene polymers at a temperature not higher than the melting point thereof. As an example of such a method, there may be employed the low temperature vulcanization method or the electron beam vulcanization method.

Firstly, in low temperature vulcanization, vulcanizing agents preferably used may include elemental sulfur, selenium, tellurium, inorganic sulfur compounds such as sulfur dichloride, sulfur chloride, etc.; organic sulfur compounds such as morpholine disulfide, alkylphenol disulfide, etc. As the vulcanization accelerators, there may be employed guanidine type vulcanization accelerators, aldehyde-ammonia type vulcanization accelerators, sulphenamide type vulcanization accelerators, thiuram type vulcanization accelerators, xanthate type vulcanization accelerators, aldehyde-amine type vulcanization accelerators, thiazole type vulcanization accelerators, thiourea type vulcanization accelerators, dithiocarbamate type vulcanization accelerators and mixed types of these. Particularly preferable vulcanizing agent is elemental sulfur, which should preferably be employed in an amount of 0.1 to 3.0 parts by weight per 100 parts by weight of the polymer. On the other hand, preferable vulcanization accelerators are xanthate type vulcanization accelerators and dithiocarbamate type vulcanization accelerators. Examples of xanthate type vulcanization accelerators may include sodium isopropylxanthate, zinc isopropylxanthate, zinc ethylxanthate, zinc butylxanthate, dibutylxanthate disulfide, etc. Examples of dithiocarbamate type vulcanization accelerators may include sodium dimethyldithicarbamate, sodium diethyldithiocarbamate, sodium di-n-butyldithiocarbamate, zinc ethylphenyldithiocarbamate, zinc dimethyldithiocarbamate, zinc diethyldithiocarbamate, zinc di-n-butyldithiocarbamate, zinc dibenzylthiocarbamate, zinc N-penta-methylenedithiocarbamate, zinc dimethylpentamethylenedithio-carbamate, zinc ethylphenyldithiocarbamate, selenium dimethyldithiocarbamate, selenium diethyldithiocarbamate, tellurium diethyldithiocarbamate, cadmium diethyldithiocarbamate, dimethylammonium dimethyldithiocarbamate, dibutylammonium dibutyldithiocarbamate, diethylamine diethyldithiocarbamate, N,N′-dimethylcyclohexane salt of dibutyldithiocarbamic acid, pipecolic methylpentamethylenedithiocarbamate, and the like. The preferable amount of the vulcanization accelerator, which may also differ depending on the vulcanization accelerator employed, may generally be 0.1 to 3.0 parts by weight per 100 parts by weight of the polymer. The temperature of the formulation during vulcanization is required to be not over the melting point of the resinous polybutadiene employed, and it is generally preferred to carry out vulcanization at a temperature of 90° C. or lower. A particularly preferable vulcanization temperature is 30° to 60° C. The vulcanization temperature, which may differ depending on the vulcanizing agent, the vulcanization accelerator and the vulcanization temperature, may generally be from some ten minutes to several days.

Another vulcanization method to be used in the present invention is the electron beam crosslinking method. In the electron beam crosslinking, no vulcanizing agent is required to be formulated, and vulcanization can be effected by irradiating an electron beam having a given intensity to a desired dose as uniformly as possible. Also, an accelerator may be formulated, if desired, whereby there may sometimes be obtained the effect of increased crosslinking efficiency by electron beam irradiation and/or an improvement of the characteristics, particularly resilience, of the polymeric resin material.

Preferable intensity of the electron beam, which may differ depending on the thickness of the polymeric resin material, may be 0.3 MeV to 5 MeV. An electron beam with an intensity smaller than 0.3 MeV cannot effect uniform crosslinking to the inner portion of the polymeric resin material, while use of an electron beam with an intensity greater than 5 MeV will markedly lower the efficiency of the electron beam acting in crosslinking.

Preferable dosage of electron beam is within the range of $10^5$ rad to $10^8$ rad.

Preferable accelerators in electron beam irradiation are maleimide compounds, thiol compounds, acrylic compounds and mixtures of these. Among them, maleimide compounds and thiol compounds are particularly preferred. Examples of maleimide compounds may include N-ethylenemaleimide, m-phenylene-dimaleimide, o-phenylenedimaleimide, hexamethylenedimaleimide, ethylenedimaleimide and dimethylformamide. Examples of thiol compounds may include dodecane thiol, dimercaptodecane, dipentene dimercaptane, α, α′-dimercapto-p-xylene and trimethylol propane trithioglycolate.

The amount of the accelerator employed may be 0.05 to 10 parts by weight, preferably 0.1 to 5 parts by weight, per 100 parts by weight of the polymer.

The temperature of the formulation during irradiation of electron beam should preferably be not over the melting point of the resinous polybutadiene employed, and it is generally preferred to effect vulcanization at a temperature of 90° C. or lower, particularly preferably at 60° C. or lower.

If desired, the low temperature vulcanization method and the electron beam crosslinking method may be used in combination.

The crystalline trans-polybutadienes provided by the present invention are excellent in moldability and workability at relatively lower temperatures, and also excellent in physical properties such as rigidity, strength, resilience, impact resistance, etc.

Also, the novel process for producing butadiene polymers provided by the present invention can produce trans-butadiene polymers at high activity and with good yield under practical conditions.

Further, the polymeric resin material of the present invention provides a practical composition containing the crystalline trans-butadiene polymers, and the polymeric resin material makes avail of the characteristics of excellent workability and physical properties of the crystalline trans-butadiene polymers, and further improve their characteristics.

The present invention is described in more detail by referring to the following Examples, which however should not be construed to be limiting the scope of the present invention.

EXAMPLES 1 AND 2 AND COMPARATIVE EXAMPLE 1 AND 2

A thoroughly dried 700 ml pressure glass bottle was stoppered and further purged internally with dry nitrogen for 3 hours. A 300 g n-hexane mixture containing 60 g of 1,3-butadiene was sealed into the bottle, followed by addition of 0.08 mmole of an organic phosphate compound of a rare earth metal, $Ln(P_1)$ [wherein Ln represents a lanthanide metal, and $P_1$

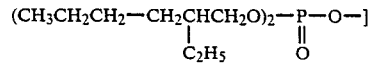

and 0.32 mmole of di-n-butylmagnesium, and polymerization was carried out at 75° C. for 1.5 hours. After polymerization, the reaction was stopped by addition of methanol, and the polymer was precipitated and separated by further adding a large amount of methanol, followed by drying in vacuo at 50° C. The conversion and the micro-structure of the polymer thus obtained are shown in Table 1.

From Table 1, it can be seen that, among the rare earth metals, lanthanum and cerium metals have higher polymerization activities, and the polymers obtained are most excellent in having higher weight average molecular weight and narrow molecular weight distribution.

organic metal as indicated in Table 2, and polymerization was carried out at 75° C. for 2 hours. The polymerization results are shown in Table 2.

TABLE 1

| Experiment No. | Rare earth metal | Conversion (%) | *2 Trans-linkage content (%) | *2 1,2-linkage content (%) | *3 Weight average molecular weight ($\times 10^4$) | *3 Molecular weight distribution $\overline{M}w/\overline{M}n$ |
|---|---|---|---|---|---|---|
| Example 1 | La | 86 | 89 | 6 | 16 | 1.2 |
| Example 2 | Ce | 83 | 89 | 6 | 11 | 1.4 |
| Comp. Example 1 | Nd | 11 | 82 | 4 | 3 | 1.7 |
| Comp. Example 2 | Di*1 | 10 | 82 | 4 | 3 | 1.6 |

*1 Mixture of La 20%, Pr 8%, Nd 72%.
*2 Value measured by IR spectrophotometer and calculated according to the method of Morero.
*3 Value measured by gel permeation chromatography.

EXAMPLES 3 THROUGH 24 AND COMPARATIVE EXAMPLE 3 THROUGH 5

According to the same method as in Example 1, 0.08 mmole of the lanthanum metal salt of organic acid as indicated in Table 2 was added to a 300 g n-hexane mixture containing 60 g of 1,3-butadiene, followed further by addition to the mixture of 0.32 mmole of the organic metal as indicated in Table 2, and polymerization was carried out at 75° C. for 2 hours. The polymerization results are shown in Table 2.

From Table 2, it can be seen that the lanthanum salts of various organic acids are effective as the component (a) in the complexed catalyst of the present invention. It is also clear that the effect of the present invention can be exhibited only when an organic magnesium compound is used as the organic metal compound of the component (b).

TABLE 2

| Example No. | Organic acid salt of lanthanum*1 | Organic metal | Conversion (%) | Trans-linkage content (%) | Weight average molecular weight ($\times 10^4$) | Molecular weight distribution $\overline{M}w/\overline{M}n$ |
|---|---|---|---|---|---|---|
| Example 3 | n-hexyl alcohol | Mg(nBu)$_2$ | 51 | 87 | 10 | 2.1 |
| 4 | 1-butanethiol | " | 55 | 88 | 9 | 1.8 |
| 5 | p-nonylphenol | " | 63 | 88 | 11 | 1.9 |
| 6 | 2-naphthalenethiol | " | 54 | 88 | 10 | 1.8 |
| 7 | n-octanoic acid | " | 59 | 87 | 8 | 1.5 |
| 8 | Vers. | " | 70 | 89 | 12 | 1.4 |
| 9 | Naphthenic acid | " | 62 | 87 | 9 | 1.5 |
| 10 | Decanethionic acid | " | 65 | 88 | 10 | 1.7 |
| 11 | Dodecylbenzenesulfonic acid | " | 62 | 88 | 9 | 1.5 |
| 12 | Mono-sulfate of lauryl alcohol | " | 59 | 87 | 9 | 1.7 |
| 13 | P$_6$ | " | 84 | 89 | 14 | 1.3 |
| 14 | P$_7$ | " | 76 | 89 | 14 | 1.3 |
| 15 | P$_1$ | " | 88 | 89 | 17 | 1.2 |
| 16 | P$_2$ | " | 85 | 89 | 16 | 1.2 |
| 17 | P$_3$ | " | 86 | 90 | 16 | 1.2 |
| 18 | P$_4$ | " | 87 | 89 | 16 | 1.2 |
| 19 | P$_5$ | " | 75 | 90 | 14 | 1.3 |
| 20 | P$_8$ | " | 79 | 89 | 14 | 1.3 |
| Example 21 | P$_9$ | Mg(nBu)$_2$ | 76 | 89 | 14 | 1.3 |
| 22 | P$_{10}$ | " | 80 | 89 | 14 | 1.3 |
| 23 | P$_{11}$ | " | 77 | 88 | 13 | 1.3 |
| 24 | P$_1$ | Mg(sec-Bu)$_2$ | 70 | 89 | 14 | 1.3 |
| Comp. Ex. 3 | P$_1$ | nBuLi | 90 | 52 | 21 | 1.4 |
| 4 | P$_1$ | AlEt$_3$ | 3 | — | — | — |

TABLE 2-continued

| Example No. | Organic acid salt of lanthanum[*1] | Organic metal | Conversion (%) | Trans-linkage content (%) | Weight average molecular weight (× 10⁴) | Molecular weight distribution $\bar{M}w/\bar{M}n$ |
|---|---|---|---|---|---|---|
| 5 | P₁ | ZnEt₂ | 1 | — | — | — |

Note: [*1]

$P_1$: $(C_4H_9\underset{\underset{C_2H_5}{|}}{CH}-CH_2O)_{\overline{2}}\overset{\overset{O}{\|}}{P}-O-H$ $P_3$: $(C_5H_{11}\underset{\underset{C_2H_5}{|}}{CH}O)_{\overline{2}}\overset{\overset{O}{\|}}{P}-O-H$ $P_2$: $(C_4H_9\underset{\underset{C_2H_5}{|}}{CH}-CH_2O)_{\overline{2}}\overset{\overset{O}{\|}}{\underset{\underset{H}{O}}{P}}(CH_2\underset{\underset{C_2H_5}{|}}{CH}C_4H_9)$ $P_4$: $(C_4H_9\underset{\underset{C_2H_5}{|}}{CH}CH_2)_{\overline{2}}\overset{\overset{O}{\|}}{P}-O-H$ $P_5$: $(n\text{-}C_9H_{19})\text{—}\bigcirc\text{—}O)_{\overline{2}}\overset{\overset{O}{\|}}{P}-O-H$ Vers.: Versatic 10 (Shell Chemical)

$P_8$: $[n\text{-}C_{12}H_{25}O(CH_2CH_2O)_n]_{\overline{2}}\overset{O}{\underset{OH}{\overset{\|}{P}}}$ n is 1.9 on an average.

$P_9$: $[n\text{-}C_{12}H_{25}O(CH_2CH_2O)_p]_{\overline{2}}P-OH$ p is 2.3 on an average.

$P_{10}$: $[nC_9H_{19}\text{—}\bigcirc\text{—}O(CH_2CH_2O)_q]_{\overline{2}}\overset{O}{\underset{OH}{\overset{\|}{P}}}$ q is 2.2 on an average.

$P_{11}$: $[nC_9H_{19}\text{—}\bigcirc\text{—}O(CH_2CH_2O)_r]_{\overline{2}}P-OH$ r is 2.6 on an average.

$P_6$: $(C_4H_9\underset{\underset{C_2H_5}{|}}{CH}CH_2O)_{\overline{2}}P-OH$ $P_7$: $(nC_9H_{19}\text{—}\bigcirc\text{—}O)_{\overline{2}}P-OH$

EXAMPLES 25 THROUGH 30

According to the same method as in Example 1, 0.36 mmole of an organic phosphate of cerium metal was added to a 300 g n-hexane mixture containing 60 g of 1,3-butadiene, followed further by addition of 1.44 mmole of an organic magnesium, and polymerization was carried out at 50° C. for 1.5 hours. The polymerization results are shown in Table 3.

From Table 3, it can be seen that cerium salts of various organic acids are effective as the component (a) in the composite catalyst of the present invention.

TABLE 3

| Example No. | Rare earth[*1] metal salt | Organic metal | Conversion (%) | Trans-linkage content (%) | Molecular weight[*2] distribution |
|---|---|---|---|---|---|
| Example 25 | Ce(P₁)₃ | Mg(n-Bu)₂ | 84.8 | 89.7 | 1.3 |
| 26 | Ce(P₂)₃ | " | 80.4 | 88.9 | 1.3 |
| 27 | Ce(P₃)₃ | " | 83.2 | 90.2 | 1.3 |
| 28 | Ce(P₄)₃ | " | 84.9 | 90.5 | 1.3 |
| 29 | Ce(P₅)₃ | " | 78.5 | 89.5 | 1.3 |
| 30 | Ce(P₁)₃ | Mg(sec-Bu)₂ | 87.2 | 90.1 | 1.3 |

Foot Note:
[*1] P₁, P₂, P₃, P₄ and P₅ respectively represent the residues of the corresponding organic acids as used in Example 3 through 24.
[*2] Value measured by gel permeation chromatography.

EXAMPLES 31 THROUGH 38

According to the same method as in Example 1, by using a 300 g n-hexane mixture containing 60 g of 1,3-butadiene in a 700 ml pressure glass bottle and adding, as the complexed catalyst, an organic phosphate of lanthanum metal [La(P$_1$)$_3$] (wherein P$_1$ is the same as defined in Example 1) and di-n-butylmagnesium in prescribed amounts, polymerization was carried out at 75° C. for 90 minutes. The polymerization results are shown in Table 4.

From Table 4, it can be seen that very high polymerization activity can be exhibited over a broad composition ratio of magnesium atoms to lanthanum metal atoms. Besides, in the preferable condition of the composition ratio, the complexed catalyst of the present invention can be appreciated to exhibit very excellent activity, providing a polymer having a large weight average molecular weight and a narrow molecular weight distribution.

pounds, organic aluminum compounds and/or electron donating compounds are added in the conditions as shown in Table 5. Polymerization was carried out at 75° C. for 90 minutes. The polymerization results are shown in Table 5.

From Table 5, it can be seen that the polymerization activity of the catalyst can be increased or the trans-linkage content, the weight average molecular weight or the molecular weight distribution of the polymer obtained can be controlled by adding an organic lithium compound, an organic aluminum compound and/or an electron donating compound in an appropriate ammount, respectively.

TABLE 5

| Example No. | Rare*[1] earth metal | Organic compound*[2] of lithium Kind | Amount*[2] added | Organic aluminum compound Kind | Amount*[3] added | Electron donating compound Kind | Amount*[3] added | Conversion (%) | Trans-linkage content (%) | Weight average molecular weight (× 10$^4$) | Molecular weight distribution Mw/Mn |
|---|---|---|---|---|---|---|---|---|---|---|---|
| Example |
| 39 | La(P$_1$)$_3$ | — | — | — | — | — | — | 91 | 89 | 8.8 | 1.2 |
| 40 | " | n-BuLi | 0.12 | — | — | — | — | 93 | 90 | 7.9 | 1.2 |
| 41 | " | n-BuLi | 0.30 | — | — | — | — | 95 | 90 | 7.0 | 1.2 |
| 42 | " | n-BuLi | 0.60 | — | — | — | — | 94 | 87 | 5.0 | 1.4 |
| 43 | " | n-BuLi | 1.00 | — | — | — | — | 95 | 81 | 3.2 | 1.5 |
| 44 | " | a | 0.12 | — | — | — | — | 92 | 90 | 8.9 | 1.2 |
| 45 | " | b | 0.12 | — | — | — | — | 94 | 90 | 8.8 | 1.2 |
| 46 | " | c | 0.12 | — | — | — | — | 94 | 90 | 9.1 | 1.2 |
| 47 | " | d | 0.12 | — | — | — | — | 93 | 90 | 9.0 | 1.2 |
| 48 | " | e | 0.12 | — | — | — | — | 93 | 90 | 8.8 | 1.2 |
| 49 | " | — | — | AlEt$_3$ | 0.30 | — | — | 96 | 91 | 4.6 | 1.4 |
| 50 | " | — | — | AlEt$_3$ | 1.80 | — | — | 95 | 93 | 2.9 | 2.2 |
| 51 | " | — | — | — | — | THF*[4] | 0.36 | 93 | 89 | 8.8 | 1.2 |
| 52 | " | — | — | — | — | THF*[4] | 0.60 | 95 | 88 | 9.0 | 1.2 |
| 53 | " | — | — | — | — | THF*[4] | 3.60 | 93 | 88 | 9.1 | 1.2 |
| 54 | " | n-BuLi | 0.12 | — | — | THF*[4] | 0.36 | 96 | 89 | 7.8 | 1.2 |
| 55 | La(P$_2$)$_3$ | n-BuLi | 0.12 | — | — | THF*[4] | 0.36 | 94 | 89 | 7.9 | 1.2 |
| 56 | La(P$_1$)$_3$ | — | — | — | — | NEt$_3$ | 9.00 | 93 | 89 | 8.9 | 1.2 |
| 57 | " | — | — | — | — | Et$_2$O | 0.36 | 94 | 89 | 8.8 | 1.2 |
| 58 | " | — | — | — | — | " | 0.60 | 93 | 89 | 9.0 | 1.3 |
| 59 | " | — | — | — | — | TMEDA*[5] | 0.03 | 92 | 88 | 8.4 | 1.4 |

Note:
*[1] P$_1$ and P$_2$ represent respectively the residues of the corresponding organic acids as used in Example 3 through 24.
*[2] a: Lithium isopropylate (CH$_3$)$_2$CHOLi
b: Lithium cellosolve CH$_3$CH$_2$OCH$_2$CH$_2$OLi
c: Lithium diethylaminoethanol (C$_2$H$_5$)$_2$NCH$_2$CH$_2$OLi
d: Dibutylaminolithium (nC$_4$H$_9$)$_2$NLi
e: Lithium pyrrolidide C$_4$H$_8$NLi
*[3] Unit: mmole/100 g-butadiene
*[4] THF: Tetrahydrofuran
*[5] TMEDA: N,N,N',N'-tetramethylethylenediamine

TABLE 4

| Example No. | Amount of catalyst added mmol / 100 g — Bd | | Conversion (%) | Trans-linkage content (%) | Weight average molecular weight (× 10$^4$) | Molecular weight distribution Mw/Mn |
|---|---|---|---|---|---|---|
| | La(P$_1$)$_3$* | Mg(n-Bu)$_2$ | | | | |
| Example |
| 31 | 0.15 | 0.075 | 41 | 80 | 18 | 1.5 |
| 32 | 0.15 | 0.15 | 46 | 85 | 19 | 1.5 |
| 33 | 0.15 | 0.30 | 55 | 88 | 16 | 1.4 |
| 34 | 0.15 | 0.45 | 82 | 89 | 16 | 1.2 |
| 35 | 0.15 | 0.75 | 91 | 90 | 13 | 1.2 |
| 36 | 0.15 | 1.50 | 72 | 90 | 6 | 1.3 |
| 37 | 0.15 | 3.0 | 51 | 90 | 3 | 1.3 |
| 38 | 0.30 | 1.2 | 97 | 89 | 8 | 1.2 |

Foot Note:
*P$_1$ represents the residue of the corresponding organic acid as used in Example 3 through 24.

EXAMPLES 39 THROUGH 59

Example 1 was repeated, except that 0.2 mmole of an organic phosphate of lanthanum metal and 0.6 mmol of di-n-butyl-magnesium were added as the catalyst per 100 g of 1,3-butadiene, and further organic lithium com-

EXAMPLES 60 THROUGH 71

A 100 ml pressure bottle was thoroughly purged with dry nitrogen, then stoppered and charged with 0.2 mmole of an organic phosphate of lanthanum metal [La(P$_1$)$_3$ or La(P$_2$)$_3$ wherein P$_1$ and P$_2$ are the same as defined in Table 5], 0.6 mmole of di-n-butylmagnesium and 10 ml of n-hexane in the conditions as indicated in Table 6 in Examples 60-64. In Examples 65-68 and 70, in the further co-presence of 2.3 g n-hexane mixture containing 20% 1,3-butadiene, and in Example 69, in the further co-presence of 0.072 mmol of n-butyllithium and 0.216 mmol of tetrahydrofuran, preliminary reaction of the catalyst was carried out in the conditions as indicated in Table 6. The complexed catalyst thus subjected to the preliminary reaction was added to a 300 g n-hexane mixture containing 20% 1,3-butadiene in a 700 ml pressure glass bottle treated in the same way as in Example 1, and polymerization was carried out at 65° C. for 3 hours. In Example 71, 0.2 mmole of an organic phosphate of lanthanum and 0.6 mmole of di-n-butylmagnesium were used as the complexed catalyst, and polymerization was conducted without preliminary reaction. The above-described preliminary reaction conditions and polymerization results are summarized in Table 6.

From Table 6, it can be seen that the catalyst activity can be increased as compared with the case where no preliminary reaction is conducted (Example 71). When preliminary reaction is conducted in the co-presence of the monomer, the catalyst activity is further increased.

polymer, trans-polyoctenamer and caprolactone polymer were weighed in the total amount of 100 g according to the compositions as shown in Table 7. Each composition was well stirred, charged into a Laboplastomill (produced by Toyo Seiki Seisakusho K.K.) already heated at a temperature of 140° C. and kneaded at a screw rotation number of 50 rpm for 5 minutes to obtain a polymer resin material. The resultant polymer resin material was press molded at 120° C., and its distortion temperature, hardness, resilience, impact strength and mold-forming moldability were tested. Also, the reworkability evaluated by repeating five times the process of kneading and press molding in the same conditions as described above, and measuring the hardness of the molded resin after cooling at room temperature for 30 minutes.

Although the physical properties may vary depending on the structure of the trans-polybutadiene, it can be seen from Table 7 that polymeric resin materials excellent in balance between hardness and flexibility, having the hardness of the resin material obtained being 90 to 98, having a resilience of 60% or more, an impact strength of 30 $Kg/cm^2$ or more, excellent mold-forming moldability and a hardness after rework of 85 or more, are butadiene polymers having a structure containing a trans-linkage content of 80 to 95%, a weight average

TABLE 6

| Example No. | Rare earth metal salt * | Preliminary reaction conditions | | | Conversion (%) | Trans-linkage content (%) | Weight average molecular weight ($\times 10^4$) | Molecular weight distribution Mw/Mn |
|---|---|---|---|---|---|---|---|---|
| | | Mixture containing 20% butadiene (g) | Temperature (°C.) | Time (hr) | | | | |
| Example 60 | La(P₁)₃ | 0 | 20 | 0.03 | 93 | 89 | 9.2 | 1.2 |
| 61 | " | " | 20 | 0.25 | 93 | 89 | 9.2 | 1.2 |
| 62 | " | " | 20 | 2.0 | 95 | 89 | 9.4 | 1.2 |
| 63 | " | " | 20 | 48 | 94 | 89 | 9.6 | 1.3 |
| 64 | " | " | 50 | 1.0 | 93 | 89 | 9.5 | 1.3 |
| 65 | " | 2.3 | 20 | 0.25 | 95 | 90 | 8.8 | 1.2 |
| 66 | " | " | 20 | 3.0 | 95 | 90 | 9.1 | 1.2 |
| 67 | " | " | 50 | 1.0 | 94 | 89 | 9.6 | 1.3 |
| 68 | La(P₂)₃ | " | 20 | 3 | 93 | 89 | 8.8 | 1.2 |
| 69 | La(P₁)₃ | " | 50 | 1.0 | 96 | 89 | 9.5 | 1.3 |
| 70 | La(P₂)₃ | " | 90 | " | 94 | 88 | 11.2 | 1.4 |
| 71 | La(P₁)₃ | — | — | — | 89 | 89 | 9.7 | 1.3 |

Foot Note:
*P₁ and P₂ respectively represent the residues of the corresponding organic acids as used in Example 3 through 24.

EXAMPLES 72-79, COMPARATIVE EXAMPLES 6-13

The trans-butadiene polymer produced according to the process of the present invention, trans-isoprene molecular weight ($\overline{Mw}$) of 30,000 to 300,000 and a molecular weight distribution ($\overline{Mw}/\overline{Mn}$) of 1.2 to 4.0 and the polymeric resin materials containing such polymers.

TABLE 7

| | | | Example | | | | | | | |
|---|---|---|---|---|---|---|---|---|---|---|
| | | | 72 | 73 | 74 | 75 | 76 | 77 | 78 | 79 |
| Structure of trans-butadiene polymer | Trans-linkage content (%) | *1 | 91 | 86 | 88 | 83 | 83 | 83 | 83 | 83 |
| | 1,2-linkage content (%) | *1 | 4 | 6 | 8 | 7 | 7 | 7 | 7 | 7 |
| | Weight average molecular weight (Mw) [ten thousands] | *2 | 17 | 28 | 9 | 25 | 13 | 18 | 18 | 18 |
| | Molecular weight distribution (Mw/Mn) | *2 | 1.7 | 1.8 | 1.6 | 3.5 | 1.3 | 1.6 | 1.6 | 1.6 |
| | Hot hexane insolubles (%) | | 0 | 0 | 0 | 0.2 | 0 | 0 | 0 | 0 |
| | M.P. (°C.) | *11 | 112 | 64 | 94 | 65 | 68 | 67 | 67 | 67 |
| Composition of polymeric resin | Trans-butadiene polymer | | 100 | 100 | 100 | 100 | 100 | 50 | 50 | 50 |
| | Trans-isoprene polymer | *3 | 0 | 0 | 0 | 0 | 0 | 50 | 0 | 0 |
| | Trans-polyoctenamer | *4 | 0 | 0 | 0 | 0 | 0 | 0 | 50 | 0 |
| | Caprolactone polymer | *5 | 0 | 0 | 0 | 0 | 0 | 0 | 0 | 50 |
| Physical properties of polymeric resin | Distortion temperature (°C.) | *6 | 77 | 65 | 74 | 55 | 56 | 55 | 42 | 54 |
| | Hardness [JIS-A] | *7 | 98 | 97 | 98 | 92 | 93 | 93 | 90 | 96 |
| | Resilience (%) | *8 | 63 | 66 | 62 | 63 | 62 | 63 | 61 | 63 |
| | Impact strength (Kg·cm/cm²) | *9 | 40 | 35 | 30 | 35 | 30 | 30 | 30 | 35 |

TABLE 7-continued

| | | | | | | | | | | |
|---|---|---|---|---|---|---|---|---|---|---|
| | Moldability | *10 | | | | | | | | |
| | Hardness after rework [JIS-A] | *7 | 98 | 97 | 98 | 91 | 92 | 92 | 90 | 95 |

| | | | Comp. Ex. | | | | | | | |
|---|---|---|---|---|---|---|---|---|---|---|
| | | | 6 | 7 | 8 | 9 | 10 | 11 | 12 | 13 |
| Structure of trans-butadiene polymer | Trans-linkage content (%) | *1 | 96 | 72 | 85 | 86 | 86 | — | — | — |
| | 1,2-linkage content (%) | *1 | 4 | 9 | 6 | 6 | 6 | — | — | — |
| | Weight average molecular weight (Mw) [ten thousands] | *2 | 16 | 19 | 65 | 2.1 | 17 | — | — | — |
| | Molecular weight distribution (Mw/Mn) | *2 | 1.6 | 1.7 | 2.4 | 1.5 | 6.3 | — | — | — |
| | Hot hexane insolubles (%) | | 0 | 0 | 0 | 0 | 1.5 | — | — | — |
| | M.P. (°C.) | *11 | 128 | Lower than 20 | 81 | 82 | 79 | — | — | — |
| Composition of polymeric resin | Trans-butadiene polymer | | 100 | 100 | 100 | 100 | 100 | 0 | 0 | 0 |
| | Trans-isoprene polymer | *3 | 0 | 0 | 0 | 0 | 0 | 100 | 0 | 0 |
| | Trans-polyoctenamer | *4 | 0 | 0 | 0 | 0 | 0 | 0 | 100 | 0 |
| | Caprolactone polymer | *5 | 0 | 0 | 0 | 0 | 0 | 0 | 0 | 100 |
| Physical properties of polymeric resin | Distortion temperature (°C.) | *6 | 96 | Un-hardened | 61 | 57 | 60 | 60 | 32 | 58 |
| | Hardness [JIS-A] | *7 | 99 | 35 | 96 | 93 | 96 | 97 | 55 | 99 |
| | Resilience (%) | *8 | 66 | — | 65 | 58 | 60 | 60 | 42 | 55 |
| | Impact strength (Kg·cm/cm$^2$) | *9 | 40 | 20 or lower | 35 | 20 or lower | 20 | 35 | 20 or lower | 40 |
| | Moldability | *10 | X | X | X | Δ | X | Δ | X | X |
| | Hardness after rework [JIS-A] | *7 | 99 | 33 | 94 | 91 | 95 | 49 | 45 | 99 |

Note:
*1 Measured by an IR spectrophotometer according to the Morero method.
*2 Measured by gel permeation chromatography.
*3 Kuraray TP-301 (produced by Kuraray Isoprene Chemical Co.)
*4 Vestenamer 8012 (produced by Huls Co.)
*5 Placcel H-7 (produced by Dicel Kagaku Kogyo Co.)
*6 The temperature at which [JIS-A] becomes 40 when the temperature is elevated from room temperature at a rate of 5° C./min.
*7 Measured according to JIS K-6301.
*8 Measured at room temperature by use of Dunlop Tripsometer.
*9 By using a Du Pont type impact tester and a notch of 2 mm × 10 mm, represented by the value when cut is generated.
*10 ○ indicates good, Δ slightly good, and X bad.
*11 Measured by a differential thermal analyzer.

EXAMPLES 80–88 AND COMPARATIVE EXAMPLES 14–22

The trans-butadiene polymer, trans-isoprene polymer, trans-polyoctenamer and caprolactone polymer were weighed in the total amount of 100 g according to the compositions as shown in Table 8 and titanium oxide as the inorganic filler in parts by weight as shown in Table 8 per 100 parts by weight of the polymeric resin components. Each composition was well stirred, charged into a Laboplastomil (produced by Toyo Seiki Seisakusho K.K.) set at a temperature of 140° C. and kneaded at a screw rotation number of 50 rpm for 5 minutes to obtain a polymer resin material. The resultant polymer resin material was press molded at 120° C., and its distortion temperature, hardness, resilience, impact strength and mold-forming moldability were tested. Also, the rework characteristic was evaluated by repeating the process of kneading and press molding in the same conditions as described above, and measuring the hardness of the molded resin after cooling at room temperature for 30 minutes.

Although the physical properties may vary depending on the structure of the trans-polybutadiene, it can be seen from Table 8 that polymeric resin materials formulated with the inorganic filler having the hardness of 90 or more, having an impact strength of 30 Kg/cm$^2$ or more, excellent mold-forming moldability and a hardness after rework of 90 or more, are those containing as the polymeric resin component butadiene polymers having a structure containing a trans-linkage content of 80 to 95%, a weight average molecular weight ($\overline{M}w$) of 30,000 to 300,000 and a molecular weight distribution ($\overline{M}w/\overline{M}n$) of 1.2 to 4.0.

TABLE 8

| | | | Example | | | | | | | | |
|---|---|---|---|---|---|---|---|---|---|---|---|
| | | | 80 | 81 | 82 | 83 | 84 | 85 | 86 | 87 | 88 |
| Structure of trans-butadiene polymer | Trans-linkage content (%) | *1 | 91 | 86 | 88 | 85 | 85 | 85 | 85 | 85 | 85 |
| | 1,2-linkage content (%) | *1 | 4 | 6 | 8 | 6 | 6 | 6 | 6 | 6 | 6 |
| | Weight average molecular weight (Mw) [ten thousands] | *2 | 17 | 28 | 9 | 22 | 12 | 17 | 17 | 17 | 17 |
| | Molecular weight distribution (Mw/Mn) | *2 | 1.7 | 1.8 | 1.6 | 3.7 | 1.3 | 1.6 | 1.6 | 1.6 | 1.6 |
| | Hot hexane insolubles (%) | | 0 | 0 | 0 | 0 | 0 | 0 | 0 | 0 | 0 |
| | M.P. (°C.) | *11 | 112 | 64 | 94 | 62 | 65 | 63 | 63 | 63 | 63 |
| Composition of | Trans-butadiene | | 100 | 100 | 100 | 100 | 100 | 50 | 50 | 50 | 100 |

TABLE 8-continued

| polymeric resin | polymer | | | | | | | | | |
|---|---|---|---|---|---|---|---|---|---|---|
| | Trans-isoprene polymer | *3 | 0 | 0 | 0 | 0 | 0 | 50 | 0 | 0 | 0 |
| | Trans-polyoctenamer | *4 | 0 | 0 | 0 | 0 | 0 | 0 | 50 | 0 | 0 |
| | Caprolactone polymer | *5 | 0 | 0 | 0 | 0 | 0 | 0 | 0 | 50 | 0 |

| | | | Comp. Ex. | | | | | | | | |
|---|---|---|---|---|---|---|---|---|---|---|---|
| | | | 14 | 15 | 16 | 17 | 18 | 19 | 20 | 21 | 22 |
| Structure of trans-butadiene polymer | Trans-linkage content (%) | *1 | 96 | 78 | 85 | 86 | 86 | 86 | — | — | — |
| | 1,2-linkage content (%) | *1 | 4 | 9 | 6 | 6 | 6 | 6 | — | — | — |
| | Weight average molecular weight (Mw) [ten thousands] | *2 | 16 | 18 | 65 | 2.1 | 17 | 28 | — | — | — |
| | Molecular weight distribution (Mw/Mn) | *2 | 1.6 | 1.9 | 2.4 | 1.5 | 6.3 | 1.8 | — | — | — |
| | Hot hexane insolubles (%) | | 0 | 0 | 0 | 0 | 0 | 0 | — | — | — |
| | M.P. (°C.) | *11 | 128 | Lower than 20 | 81 | 82 | 79 | 71 | — | — | — |
| Composition of polymeric resin | Trans-butadiene polymer | | 100 | 100 | 100 | 100 | 100 | 100 | 0 | 0 | 0 |
| | Trans-isoprene polymer | *3 | 0 | 0 | 0 | 0 | 0 | 0 | 100 | 0 | 0 |
| | Trans-polyoctenamer | *4 | 0 | 0 | 0 | 0 | 0 | 0 | 0 | 100 | 0 |
| | Caprolactone polymer | *5 | 0 | 0 | 0 | 0 | 0 | 0 | 0 | 0 | 100 |

| | | | Example | | | | | | | | |
|---|---|---|---|---|---|---|---|---|---|---|---|
| | | | 80 | 81 | 82 | 83 | 84 | 85 | 86 | 87 | 88 |
| Formulating agent | Titanium oxide (parts) | *6 | 15 | 15 | 15 | 15 | 15 | 15 | 15 | 15 | 50 |
| Physical properties of polymeric resin | Distortion temperature (°C.) | *7 | 77 | 66 | 74 | 59 | 58 | 59 | 45 | 58 | 62 |
| | Hardness [JIS-A] | *8 | 98 | 97 | 98 | 96 | 96 | 96 | 93 | 98 | 96 |
| | Impact strength (kg·cm/cm²) | *9 | 40 | 35 | 30 | 35 | 30 | 35 | 30 | 35 | 30 |
| | Moldability | *10 | | | | | | | | | |
| | Hardness after rework [JIS-A] | *8 | 98 | 97 | 98 | 95 | 95 | 95 | 93 | 98 | 96 |

| | | | Comp. Ex. | | | | | | | | |
|---|---|---|---|---|---|---|---|---|---|---|---|
| | | | 14 | 15 | 16 | 17 | 18 | 19 | 20 | 21 | 22 |
| Formulating agent | Titanium oxide (parts) | *6 | 15 | 15 | 15 | 15 | 15 | 150 | 15 | 15 | 15 |
| Physical properties of polymeric resin | Distortion temperature (°C.) | *7 | 95 | 31 | 59 | 56 | 59 | 64 | 61 | 35 | 60 |
| | Hardness [JIS-A] | *8 | 99 | 85 | 95 | 92 | 96 | 97 | 97 | 62 | 99 |
| | Impact strength (kg·cm/cm²) | *9 | 40 | 20 | 35 | 20 or lower | 20 | 20 or lower | 30 | 20 or lower | 40 |
| | Moldability | *10 | X | Δ | X | Δ | X | | Δ | X | X |
| | Hardness after rework [JIS-A] | *8 | 99 | 83 | 94 | 91 | 96 | 97 | 45 | 46 | 99 |

Note:
*1 Measured by an IR spectrophotometer according to the Morero method.
*2 Measured by an gel permeation chromatography.
*3 Kuraray TP-301 (produced by Kuraray Isoprene Chemical Co.)
*4 Vestenamer 8012 (produced by Huls Co.)
*5 Placcel H-7 (produced by Dicel Kagaku Kogyo Co.)
*6 Titanium White A-100 (produced by Ishihara Sangyo K.K.)
*7 The temperature at which [JIS-A] becomes 40 when the temperature is elevated from room temperature at a rate of 5° C./min.
*8 Measured according to JIS K-6301.
*9 By using a Du Pont type impact tester and a notch of 2 mm × 10 mm, represented by the value when cut is generated.
*10 ○ indicates good, Δ slightly good, and X bad.
*11 Measured by a differential thermal analyzer.

EXAMPLE 89 AND COMPARATIVE EXAMPLE 23

The polymeric resin material containing the crystalline trans-butadiene polymers of the present invention can generally be employed without vulcanization. However, depending on the uses such as golf ball cover materials, it may sometimes be preferable to use the material with vulcanization for further improvement of strength and impact resistance.

Among the presently commercially available golf balls, for the outer skins of the golf balls with a three-piece structure, resin materials containing trans-isoprene polymers vulcanized at low temperature are usually used. Here, the effectiveness when employing the polymeric resin material of the present invention is described as compared with trans-isoprene polymer.

A composition shown in Table 9 was mixed by means of a Brabender mixer (Brabender is a registered trade mark) which was operated at 100° C., at a rotor speed of 160 rpm, for 5 hours. Then, the formulated composition was press molded at 140° C. into a sheet having a thickness of 2 mm. The formulated sheet obtained was immersed in a solution containing a vulcanization accelerator previously prepared (a 5% aqueous solution of pentamethylene dithiocarbamic acid piperidine) at a liquid temperature of about 40° C. for 24 hours. The formulated sheet after immersion was subsequently aged at about 40° C. for 48 hours and then its physical properties were evaluated.

The formulated composition is shown in Table 9 and the results of evaluation of physical properties in Table 10. The polymer employed in Example 89 was prepared according to the process of the present invention, and the polymer employed in Comparative example 23 was a trans-isoprene polymer (TP 301, produced by Kuraray Isoprene Chemical Co.).

As apparently seen from the results of evaluation of physical properties in Table 10, the polymeric resin material subjected to low temperature vulcanization of the present invention has excellent specific features of further improved resilience and impact strength.

TABLE 9

| Polymer | 100 [wt. parts] |
|---|---|
| Titanium dioxide | 10 |
| Zinc oxide | 5 |
| Sulfur | 1 |

TABLE 10

|  | Example 89 | Comp. Ex. 23 |
|---|---|---|
| [Properties of polymer] | | |
| 1.4-Trans-linkage content (%) | 92 | |
| Weight average molecular weight (× 10,000) | 16 | |
| Molecular weight distribution (Mw/Mn) | 1.7 | |
| [Vulcanized properties] | | |
| Hardness (JIS-D) | 54 | 48 |
| 100% Modulus (Kg/cm$^2$) | 149 | 85 |
| Tensile strength (Kg/cm$^2$) | 230 | 260 |
| Elongation (%) | 420 | 470 |
| Dunlop resilience (% at 25° C.) | 66 | 53 |
| Du Pont dart impact strength (Kg · cm) | 55 | 30 |

EXAMPLE 90 AND COMPARATIVE EXAMPLE 24

A molded sheet having a thickness of 2 mm was prepared from a composition shown in Table 11 according to the same operation as in Example 89. Then, this sheet was crosslinked at about 40° C. by irradiation of an electron beam of 80 Megarad[*1]).

(*) Electron beam irradiating device (produced by Nisshin Denki K.K.) Acceleration voltage: 500 KV Current in tube: 25 mA The results of evaluation of physical properties by using the crosslinked sheet obtained are shown in Table 12. The polymer employed in Example 90 was the same trans-butadiene polymer as employed in Example 89, and the polymer employed in Comparative example 24 was trans-isoprene polymer (TP-301).

The formulated composition is shown in Table 11 and the results of evaluation of physical properties in Table 12.

As apparently seen from the results of evaluation of physical properties, also in the crosslinked product obtained by electron beam crosslinking, the trans-butadiene polymer resin material of the present invention exhibits its sufficiently improved specific features such as excellent resilience and impact strength.

TABLE 11

| Polymer | 100 [wt. parts] |
|---|---|
| Titanium oxide | 10 |

TABLE 12

|  | Example 90 | Comp. Ex. 24 |
|---|---|---|
| [Properties of polymer] | | |
| 1.4-Trans-linkage content (%) | 92 | |
| Weight average molecular weight (× 10,000) | 16 | |
| Molecular weight distribution (Mw/Mn) | 1.7 | |
| [Vulcanized properties] | | |
| Hardness (JIS-D) | 55 | 51 |
| 100% Modulus (Kg/cm$^2$) | 146 | 90 |
| Tensile strength (Kg/cm$^2$) | 215 | 280 |
| Elongation (%) | 410 | 450 |
| Dunlop resilience (% at 25° C.) | 65 | 54 |
| Du Pont dart impact strength (Kg · cm) | 55 | 27 |

EXAMPLE 91

Polymerization was carried out in the same manner as in Example 1 except for employing 54 g of 1,3-butadiene and 6 g of isoprene as the monomers and lanthanum as the lanthanide metal species. The polymerization results are shown in Table 13.

From Table 13, it can be seen that copolymerization of butadiene and isoprene is possible according to the process of the present invention.

TABLE 13

|  | Conversion (%) | Isoprene content (wt %) | Trans-linkage content in butadiene moiety (%) | 1,2-linkage content in butadiene moiety (%) | Weight average molecular weight (× 10$^4$) | Molecular weight distribution (Mw/Mn) |
|---|---|---|---|---|---|---|
| Example 91 | 84 | 8 | 89 | 6 | 17 | 1.7 |

EXAMPLE 92

By using the polymer prepared in Example 91, physical properties as the single component were evaluated in the same way as in Examples 72 to 79. The results are shown in Table 14.

TABLE 14

| m.p. (°C.) | 61 |
|---|---|
| Distortion (°C.) temperature | 63 |
| Hardness [JIS-A] | 95 |
| Resilience (%) | 60 |

TABLE 14-continued

| | |
|---|---|
| Impact strength (Kg cm/cm²) | 35 |
| Moldability | good |
| Hardness after rework [JIS-A] | 94 |

The polymer obtained was rather lower in melting point and distortion temperature than the homopolymer having the same trans-linkage content, but it was found to be excellent in workability and balance of physical properties similarly to the butadiene homopolymer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A process for producing butadiene polymers, which comprises carrying out polymerization of butadiene monomer or butadiene monomer with another conjugated monomer in the presence of a complexed catalyst, wherein said complexed catalyst is comprised of (a) a salt of a metal consisting of lanthanum or cerium with an organic acid and (b) an organic magnesium compound, wherein the amount of the catalytic component (a) is 0.01 to 1 m mole and the amount of the catalytic component (b) is 0.02 to 1.2 m mole, respectively, per 100 g of the conjugated diene monomer, and further the molar ratio of (a)/(b) is 10/1 to 1/50, the catalyst component (a) being derived from an organic acid of the following formulae (I) to (VI)

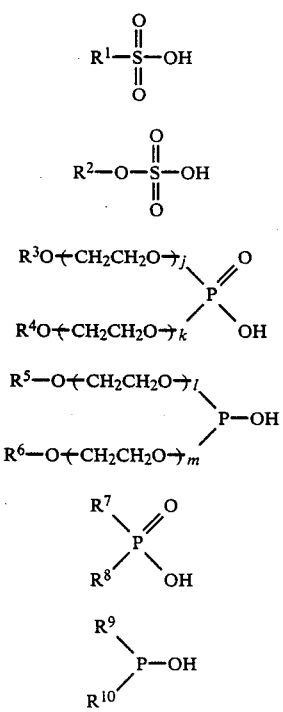

wherein each of the radicals $R^3$ to $R^6$ is an aliphatic hydrocarbon group or an aromatic hydrocarbon group, $R^1$ is an aromatic hydrocarbon group, $R^2$ is an aliphatic hydrocarbon group, each of the radicals $R^7$ to $R^{10}$ is an aliphatic hydrocarbon group, an aromatic hydrocarbon group, an alkoxy group or a phenoxy group, and j, k, l and m are integers of from 1 to 6.

2. A process according to claim 1, wherein the complexed catalyst further contains at least one of (c) an organic lithium compound, (d) an organic aluminum compound and (e) an electron donating compound.

3. A process according to claim 2, wherein the component (a) is an organic acid salt of lanthanum.

4. A process according to claim 2, wherein the component (a) is an organic acid salt of cerium.

5. A process according to claim 2, wherein the component (a) is an organic phosphoric acid salt of lanthanum.

6. A process according to claim 2, wherein the component (a) is an organic phosphoric acid salt of cerium.

7. A process according to claim 2, wherein a portion or all of the catalyst components were made to react with each other in the presence or absence of the conjugated diene monomer prior to polymerization.

8. A process according to claim 1, wherein a portion of all of the catalyst components were made to react with each other in the presence or absence of the conjugated diene monomer prior to polymerization.

9. A polymeric resin material, comprising at least 30% by weight of a trans-butadiene polymer or copolymer as obtained according to claim 1 as a polymeric component.

10. A polymeric resin material according to claim 9, wherein the polymeric component comprises 30 to 90% by weight of a trans-butadiene polymer and 70 to 10% by weight of a trans-isoprene polymer.

11. A polymeric resin material according to claim 9, wherein the polymeric component comprises 30 to 90% by weight of a trans-polybutadiene polymer and 70 to 10% by weight of a trans-polyoctenamer.

12. A polymeric resin material according to claim 9, wherein the polymeric component comprises 30 to 90% by weight of a trans-polybutadiene polymer and 70 to 10% by weight of a caprolactone polymer.

13. A polymeric resin material according to claim 9, wherein the composition is vulcanized by a low temperature vulcanization at a temperature not higher than the melting point of the trans-butadiene polymer or electron beam vulcanization.

14. A polymeric resin material according to claim 10, wherein the composition is vulcanized by a low temperature vulcanization at a temperature not higher than the melting point of the trans-butadiene polymer or electron beam vulcanization.

15. A golf ball cover material, employing the polymeric resin material according to claim 9.

16. A golf ball cover material, employing the polymeric resin material according to claim 10.

17. A golf ball cover material, employing the polymeric resin material according to claim 13.

18. A golf ball cover material, employing the polymeric resin material according to claim 14.

19. A splint or gyps material, employing the polymeric resin material according to claim 9.

20. A splint or gyps material, employing the polymeric resin material according to claim 10.

21. A head mold material for a wig, employing the polymeric resin material according to claim 9.

22. A head mold material for a wig, employing the polymeric resin material according to claim 10.

23. A polymeric resin material according to claim 11, wherein the composition is vulcanized by a low temperature vulcanization at a temperature not higher than the melting point of the trans-butadiene polymer of electron beam vulcanization.

24. A polymeric resin material according to claim 12, wherein the composition is vulcanized by a low temperature vulcanization at a temperature not higher than the melting point of the trans-butadiene polymer of electron beam vulcanization.

25. A golf ball cover material, employing the polymeric resin material according to claim 11.

26. A golf ball cover material, employing the polymeric resin material according to claim 12.

27. A splint or gyps material, employing the polymeric resin material according to claim 11.

28. A splint or gyps material, employing the polymeric resin material according to claim 12.

29. A head mold material for a wig, employing the polymeric resin material according to claim 11.

30. A head mold material for a wig, employing the polymeric resin material according to claim 12.

31. A process according to claim 1, wherein the metal of the component (a) is lanthanum.

32. A process according to claim 1, wherein the metal of the component (a) is cerium.

* * * * *